United States Patent [19]

Dodt

[11] Patent Number: 4,689,513
[45] Date of Patent: Aug. 25, 1987

[54] EDDY CURRENT BRAKE COOLING

[75] Inventor: Hans-Walter Dodt, Muehltal, Fed. Rep. of Germany

[73] Assignee: Carl Schenck AG., Fed. Rep. of Germany

[21] Appl. No.: 782,053

[22] Filed: Sep. 30, 1985

[30] Foreign Application Priority Data

Dec. 24, 1984 [EP] European Pat. Off. ........ 84116281.1

[51] Int. Cl.$^4$ .......................... F28F 5/00; H02K 7/104
[52] U.S. Cl. ....................................... 310/93; 165/174; 310/54
[58] Field of Search .................. 165/96, 172, 173, 174; 310/54, 65, 60 R, 60 A, 93, 105

[56] References Cited

U.S. PATENT DOCUMENTS

| | | |
|---|---|---|
| 2,386,701 | 10/1945 | Martin . |
| 2,414,532 | 1/1947 | Johns et al. . |
| 2,763,794 | 9/1956 | Baudry ................................. 310/54 |
| 2,803,764 | 8/1957 | Lundskow ........................... 310/54 |
| 2,862,120 | 11/1958 | Onsrud ................................. 310/54 |
| 2,871,363 | 1/1959 | King ..................................... 310/105 |
| 3,363,123 | 1/1968 | Jaeschke ............................. 310/105 |
| 3,765,480 | 10/1973 | Fries ..................................... 310/54 |

FOREIGN PATENT DOCUMENTS

| | | |
|---|---|---|
| 354806 | 6/1922 | Fed. Rep. of Germany . |
| 1401669 | 10/1968 | Fed. Rep. of Germany ...... 165/174 |
| 1488525 | 6/1969 | Fed. Rep. of Germany . |
| 2541424 | 3/1977 | Fed. Rep. of Germany ...... 165/174 |

OTHER PUBLICATIONS

European Search Report-EP 84 11 6281 (8/8/85).

Primary Examiner—William H. Beha, Jr.
Assistant Examiner—D. L. Rebsch
Attorney, Agent, or Firm—Connolly and Hutz

[57] ABSTRACT

An eddy current brake has a particular cooling system which alleviates overheating of the brake and its individual components. Cooling conduits comprising a plurality of parallel flow lines are disposed close to the heated components and the arrangement is such that heat is uniformly exchanged and removed from the brake. Cooling medium flows through the conduits along the plurality of flow lines and the distribution of cooling medium is such that the velocity of flow is substantially equal along each line.

16 Claims, 12 Drawing Figures

Fig. 1.
(Prior Art)
Fig. 2.
(Prior Art)
Fig. 3.
(Prior Art)
Fig. 9.
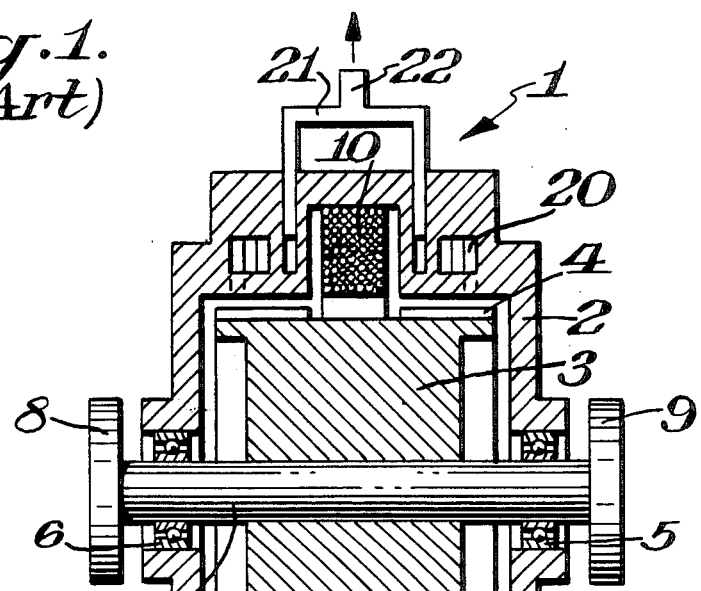
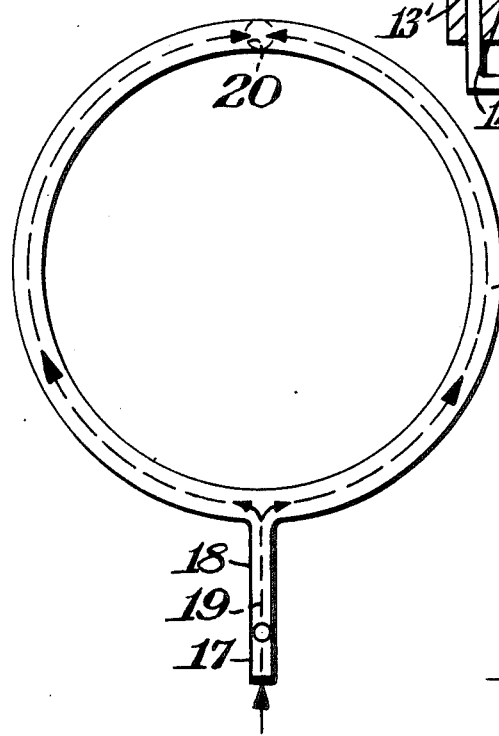
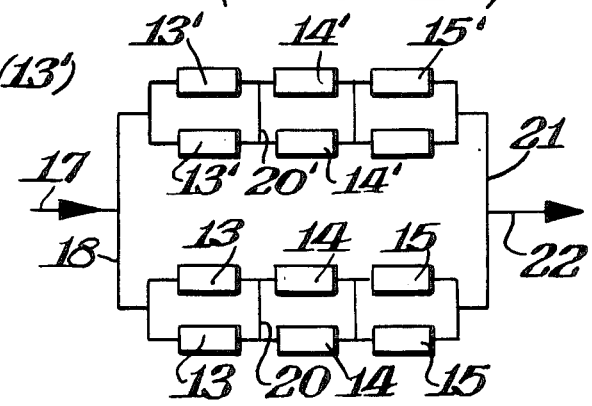
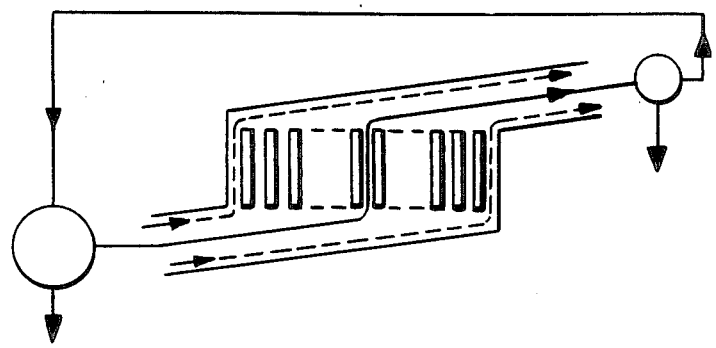

EDDY CURRENT BRAKE COOLING

BACKGROUND OF THE INVENTION

The present invention relates to an eddy current brake and the cooling thereof by means of a cooling medium.

Eddy current brakes are used to test power plants whereby the energy developed by the power plant is converted, by means of eddy currents, into heat within the brake system. As a result of the eddy currents, the total brake system is heated and care must be taken to remove the heat.

Heretofore proposed eddy current brakes have the general disadvantage in that their application is somewhat limited in those cases where continuous high loads are applied. These limitations occur because it is extremely difficult or impossible to remove the heat that is developed. Because of poor heat transfer which results from the shape of the cooling passages and also from the predominant flow velocities within the cooling passages, the temperature differentials between the inner housing wall of the brake on the side of the rotor and the outer wall are so high that plastic deformations occur of the components carrying the cooling fluid. This may cause seizure of the eddy current brake. Also, the elevated temperatures that result from deformation may, after some time, affect the bearings and may exceed tolerable temperature levels. As a result of repeated plastic deformations at relatively high loads, cracks develop after relatively short service time. This causes cooling fluid to enter into the inner chamber of the machine, rendering it useless.

SUMMARY OF THE INVENTION

Accordingly, it is an object of the present invention to cool an eddy current brake in a reliable and dependable manner by uniformly removing heat and uniformly transferring heat between the cooling medium and those brake components that are to be cooled, specifically the entrance and exit zones of the eddy current brake. Through the requirement of equal flow velocities of the cooling medium at the entrance and the exit of the section to be cooled, uniform heat transfer and uniform heat removal is achieved. Local overheating of the material of the eddy current brake heated by the eddy currents is clearly avoided even during continuous operation. The invention therefore includes structure which allows increases in the service life of an eddy current brake of a given size.

An especially suitable form of an eddy current brake according to the invention includes coupling flanges for the power plant to be tested. Stator windings as an exciter are contained in the magnetizable portion and the rotor consists of magnetizable material with serrations. Cooling channels are arranged around the rotor and structure is provided to induct and extract the cooling medium. As a special result of the shaping of the inner walls of the entrance and exit spaces and of their 180° staggered position, the cooling medium flows with uniform velocity into the area that is to be cooled and is carried out of this area with the same velocity thereby producing uniform heat removal. It is viewed as a feature of the invention that the entrance and exit cavities, beginning with the largest distance between the cylindrical outer wall and the inner wall, exhibit a spiral configuration from 0° to 180° and a spiral configuration from 360° to 180°, consisting therefore of two partial spirals. The coolant may be a gaseous as well as a liquid medium.

The configuration of the cooling ducts comprises a multitude of relatively short cooling channels with a relatively large total sectional area. For further improvement of heat removal the wall thickness within the area of the radial inner wall of the eddy current brake is uniform.

In order to control the volume flow of the cooling medium a pressure pump is used. When this pump is placed upon the shaft of the eddy current brake, the velocity of the cooling medium will be increased in direct proportion to the rotational speed of the eddy current brake. For constant torque the flow increases in proportion with power. When the pressure pump is equipped with a separate controllable drive, the heat transfer can be regulated according to power at any speed.

A radiator may be arranged between the exit and entrance, and a temperature regulating discharge may be provided between the exit and entrance. Hence circulation of the cooling medium is achieved without excessively high temperatures in the areas of the eddy current brake that are to be cooled.

The cooling of the eddy current brake can be further optimized according to an inventive modification, by means of regulating the separate drive of the pressure pump. Also, an increase of system pressure may be used to achieve optimum heat removal from the area of the eddy current brake that is to be cooled.

BRIEF DESCRIPTION OF THE DRAWING

Novel features and advantages of the present invention in addition to those mentioned above will become apparent to those of ordinary skill in the art from a reading of the following detailed description in conjunction with the accompanying drawing wherein similar reference characters refer to similar parts and in which:

FIG. 1 is a longitudinal sectional view of an eddy current brake of known construction, according to the prior art;

FIG. 2 is a transverse diagrammatic view of the path of the cooling medium in the eddy current brake of FIG. 1;

FIG. 3 is a diagrammatic schematic view of the flow of cooling medium through the eddy current brake of FIG. 1;

FIG. 9 is a diagrammatic view illustrating the closed cooling circuit of the present invention;

Figure 4:
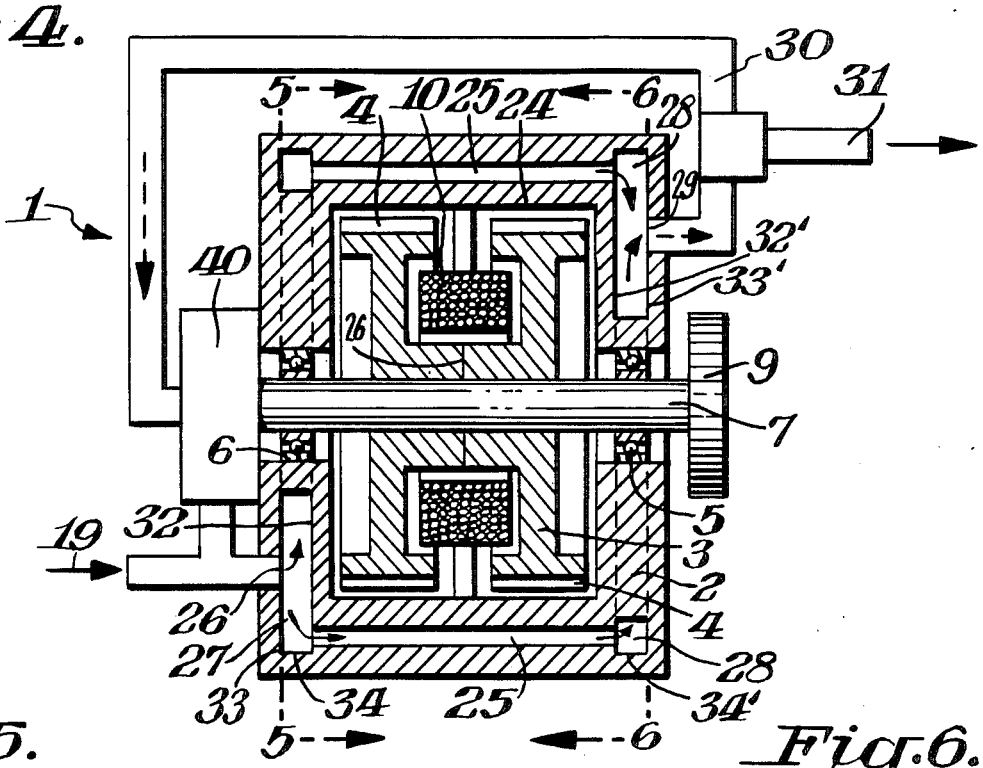
FIG. 4 is a longitudinal sectional view of an eddy current brake, according to the present invention.

Referring in more particularity to FIG. 1, a heretofore proposed and common eddy current brake 1 includes a trunion mounted housing 2 containing a rotor 3 having serrations 4 on its circumference. The rotor is mounted on a shaft 7 journaled to housing 2 by ball bearings 5 and 6. Shaft 7 is equipped with coupling flanges 8 and 9 to which the power plant to be tested may be coupled.

A stationary excitation coil 10 embedded in the housing is positioned radially outwardly from the rotor. The coil is excited by direct current, and as a result, a magnetic field is created on the serrations 4 of the rotor 3. Rotation of the rotor 3 by means of a power plant connected to the coupling flange 9 interrupts the stationary field, and a pulsating magnetic field is created in the inner walls of 11, 12 of the housing 2 which surround the serrations 4. The pulsating magnetic field has a frequency similar to that of the passing serrations. This creates an eddy current in these walls. The heat created by this process within the inner walls is removed by the cooling medium flowing through cooling channels 13–15 for the right-hand side of the eddy current brake and channels 13'–15' for the left-hand side of the eddy current brake.

The cooling medium flows through inlet 17 and a distribution duct 18 into the cooling channels of the right and left side of the eddy current power brake.

The flow pattern of the cooling medium 19 is explained in more detail with reference to FIGS. 2 and 3. Specifically, part of the cooling medium 19 flows via the distribution duct 18 toward the cooling channel 13, while the other part of the cooling medium flows toward the cooling channel 13'. Within the cooling channels 13,13' the cooling medium is divided once more and is transported to a transition opening 20 as a result of the pressure created by a cooling medium pump. From the transition openings 20,20', the cooling medium is guided into the next ring of the cooling channel 14,14' where it is again divided and further conducted toward cooling channel 15,15'. From this location the cooling medium is released in heated condition via a confluence duct 21 into and through the outlet 22.

Because the cooling medium is guided inside the annular cooling channels 13–15 and 13'–15', the housing 2 is not cooled evenly in the region of the inner walls 11,12. Also, due to the small size of the cooling channels, the likelihood of clogging exists. When the channels are made large in size to lessen the possibility of clogging, the cooling action is reduced, and the final cooling result is further reduced. Since the temperature of the inner walls 11,12 is considerably higher than the temperature of the outer wall of the housing 2, it is understandable that, as a result of such annular cooling channels, the housing will distort after prolonged service. This gives rise to extreme heat loads of such eddy current power brakes and also to distortions of the housing. This finally results in cracking of the components carrying the cooling medium or seizure of the eddy current brake.

DETAILED DESCRIPTION OF THE INVENTION

FIG. 4 illustrates an eddy current power brake 1 according to the present invention. Within the housing 2 of the eddy current power brake, the rotor also has serrations 4, and is carried by ball bearings 5,6. The eddy current power brake 1 also has a coupling flange 9 to which the power plant to be tested may be connected. While the eddy current power brake according to the present invention also includes an excitation coil 10, the coil protrudes inside the rotor 3. Division of the rotor 3 in the area 23 according to the invention makes it possible that the excitation coil 10 is additionally enveloped by the serrations 4. Otherwise the function of the eddy current power brake of FIG. 4 is the same as already explained in connection with the brake of FIG. 1.

In the case of the present invention, a cylindrical inner wall 24 forms a closed surface along which run in close proximity the serrations 4 of the rotor 3. The inner wall 24 which becomes heated for reasons explained above is surrounded by axially oriented straight cooling channels 25 located in the cylindrical part of the housing 2. The straight cooling channels 25 are equidistantly arranged along the cylindrical part of housing 2 as shown best in FIGS. 5 and 6.

The cooling medium enters via an entrance opening 26 into an entrance cavity 27 and then flows through the straight cooling channels 25 to an exit cavity 28. From the exit cavity the cooling medium flows via exit opening 29 through the circular duct 30 back to the entrance opening 26, or alternatively, such medium exits through exit 31.

The entrance cavity 27 and the exit cavity 28 are formed by the inner face walls 32,32' of the eddy current power brake and by the housing walls 33,33' which are an integral part of the power brake and which contain the entrance opening 26 and the exit opening 29. The above walls define the entrance and exit cavities in axial direction. In the radial direction the cavities are defined by a cylindrical wall 34,34' as an outer wall and on the other hand by a spiral-like or eccentric inner wall 35,35'.

According to the invention, the entrance cavity 27 and the exit cavity 28 are of spiral-like configuration whereby the entrance opening 26 is staggered by 180° from the exit opening 29. This results in a distribution of the cooling medium in this space in such a form that within the area of the eddy current brake through which the cooling medium flows, each flowline (see FIG. 9), following the inventive method, possesses equal flow velocity at the entrance and exit of the section to be cooled. Therefore equal flow velocities are maintained at the entrance and exit of the straight cooling channels 25.

Figures 5, 6:
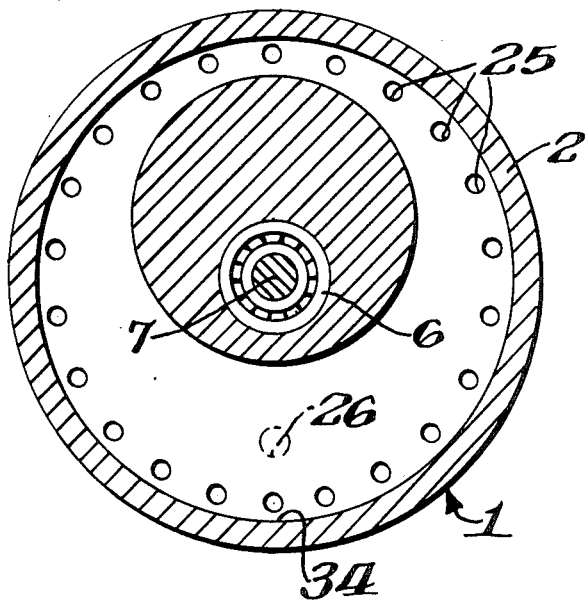
FIG. 5 is a sectional view taken along line 5—5 of FIG. 4.
FIG. 6 is a sectional view taken along line 6—6 of FIG. 4.
Figure 7:
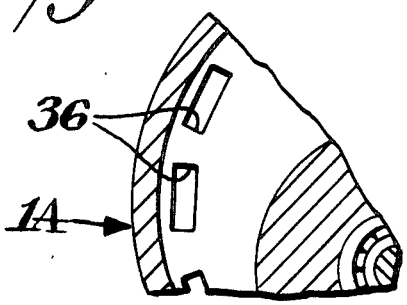
FIG. 7 is a fragmental sectional view similar to FIG. 5 illustrating an alternate embodiment.
Figure 8:
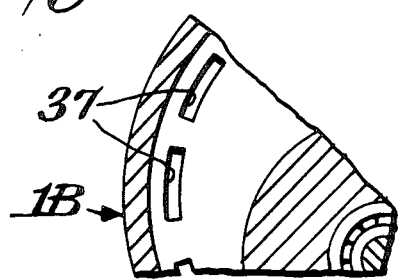
FIG. 8 is a fragmental sectional view similar to FIG. 5 illustrating still another alternate embodiment.

The cooling channels 25 may, as shown in FIGS. 5 and 6, be circular in cross section. Also corresponding channels 36 may be rectangular as shown in FIG. 7 illustrating brake 1A or arcuate channels 37 may be used conforming to the cylindrical inner wall, as shown in FIG. 8 illustrating brake 1B. The rectangular cooling channels 36 are longitudinally oriented as are the arcuate channels 37.

Under the term eddy current brake an eddy current power brake is understood which is capable of absorbing the crankshaft power of a power plant.

Figure 10:
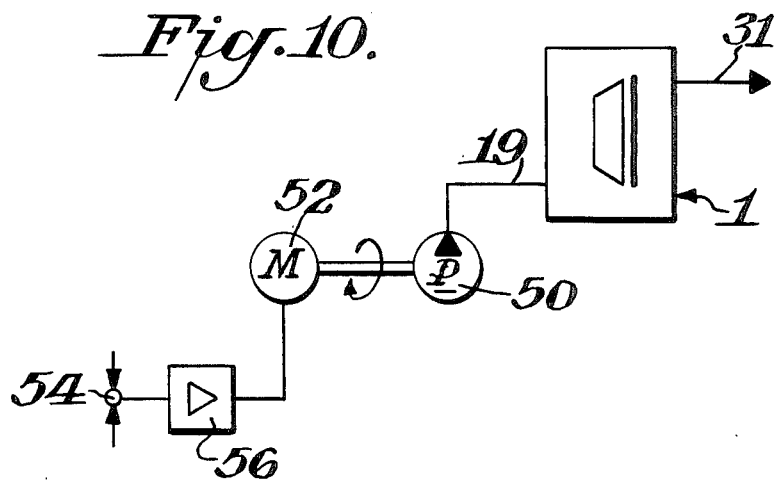
FIG. 10 is a diagrammatic schematic view illustrating a separate and controllable pump for the cooling medium.

FIG. 10 is a diagrammatic schematic illustrating a separate pump 50 for supplying cooling medium to the eddy current brake 1 via line 19. Unlike the system of FIG. 4 which includes a pump 40 for the cooling medium driven by the rotor 7, separate pump 50 has an independent and controllable drive in the form of motor 52. A suitable power source 54 is connected to the motor and a regulator 56 is provided for the motor.

Figure 11:
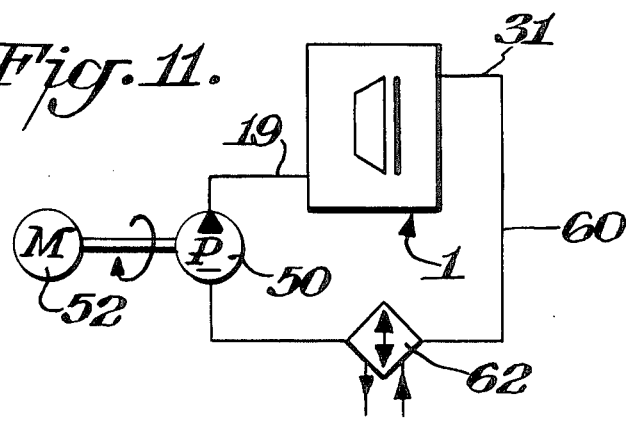
FIG. 11 is a diagrammatic schematic view illustrating a separate and controllable pump for the cooling medium and a heat exchange device for cooling recirculating cooling medium.

FIG. 11 diagrammatically illustrates a conduit 60 interconnecting the entrance and exit cavities of the eddy current brake 1. As such, when the cooling medium exits the brake, it is simply recirculated via the conduit 60 to the entrance cavity for the cooling medium. A pump 50 is provided in the recirculating conduit while motor 52 is connected to drive the pump. A cooler or heat exchanger 62 is located in the recirculating conduit 60 for cooling the medium as it travels from the exit of the eddy current brake to the entrance thereof.

Figure 12:
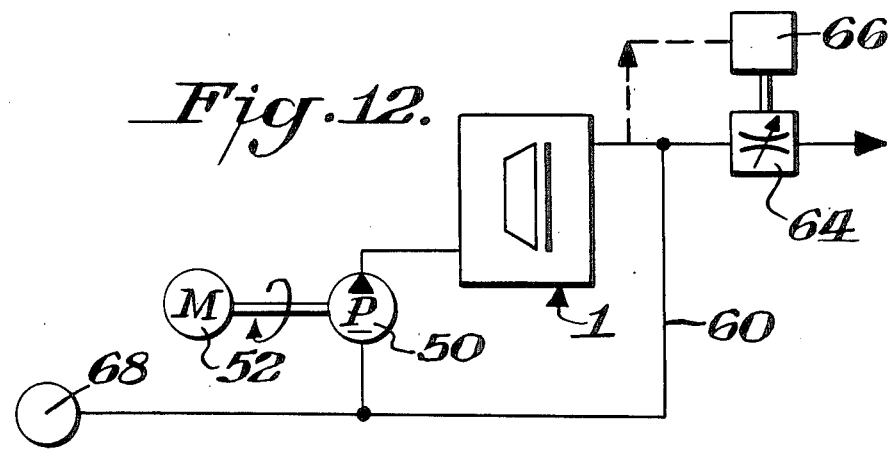
FIG. 12 is a diagrammatic schematic view of a system that provides temperature regulated exit flow of the cooling medium and supplies fresh cooling medium.

FIG. 12 is similar in many respects to the schematic of FIG. 11 and similar parts thereof have been identified by similar reference characters. Additionally, the system of FIG. 12 includes a temperature regulated drain 64 in the recirculating conduit 60 for removing the cooling medium when the temperature thereof exceeds a predetermined amount. A temperature regulator 66 is connected to sense the temperature of the cooling medium exiting the eddy current brake and when that temperature exceeds a predetermined amount, the regulator opens the drain to remove quantities of the cooling medium until the exit temperature thereof is reduced. Fresh cooling medium from supply 68 is delivered to recirculating conduit 60 as makeup for the cooling medium drained at 64.

We claim:

1. A method of uniformly cooling an inner cylindrical wall of an eddy current brake heated by eddy currents comprising the steps of flowing a cooling medium through the brake along a plurality of flow lines of substantially equal length from a cooling medium input opening to a cooling medium discharge opening, separating the plurality of flow lines from the inner cylindrical wall of the eddy current brake, locating a portion of each flow line in the cylindrical wall of the brake and arranging these portions so that they are parallel to one another and substantially equally spaced apart, and maintaining the velocity of flow of cooling medium substantially equal along each line.

2. An eddy current brake comprising a housing having opposite side walls and an interconnecting cylindrical wall, a stator within the housing, a rotor journalled between the opposite side walls of the housing constructed and arranged to cooperate with the stator in the production of eddy currents, an entrance cavity for cooling medium in one side wall of the housing, an exit cavity for cooling medium in the other side wall of the housing, a plurality of equally spaced apart axially aligned cooling channels in the cylindrical wall of the housing extending between the entrance and exit cavities, the entrance and exit cavities for the cooling medium each having an outer cylindrical surface concentric with the axis of rotation of the rotor and an inner cylindrical surface eccentric with the axis of rotation of the rotor, an input opening in the entrance cavity located in the area of maximum distance between the inner and outer cylindrical surfaces thereof, a discharge opening in the exit cavity located in the area of maximum distance between the inner and outer cylindrical surfaces thereof, and the input and discharge openings being spaced approximately 180° from each other.

3. An eddy current brake as in claim 2 wherein the spacing between adjacent cooling channels is approximately 5% of the axial length of the channels.

4. An eddy current brake as in claim 2 wherein the cylindrical wall of the housing has an inside surface and the distance between the inside surface and the cooling channels is approximately equal to the spacing between adjacent cooling channels.

5. An eddy current brake as in claim 3 wherein the cylindrical wall of the housing has an inside surface and the distance between the inside surface and the cooling channels is approximately equal to the spacing between adjacent cooling channels.

6. An eddy current brake as in claim 2 wherein the cross section of each cooling channel is circular.

7. An eddy current brake as in claim 2 wherein the cross section of each cooling channel is rectangular.

8. An eddy current brake as in claim 2 wherein the cross section of each cooling channel is arcuate.

9. An eddy current brake as in claim 2 including a pump connected to be driven by the rotor and constructed and arranged to circulate cooling medium to and through the entrance and exit cavities and the cooling channels.

10. An eddy current brake as in claim 2 including a pump constructed and arranged to circulate cooling medium to and through the entrance and exit cavities and the cooling channels, and a separate and controllable drive for the pump.

11. An eddy current brake as in claim 2 including conduit means between the exit cavity and the entrance cavity for recirculating the cooling medium, and heat exchange means in the conduit means for reducing the temperature of the recirculating cooling medium.

12. An eddy current brake as in claim 2 including conduit means between the exit cavity and the entrance cavity for recirculating the cooling medium, and a pump in the conduit means for increasing the pressure of the recirculating cooling medium.

13. An eddy current brake as in claim 2 including conduit means between the exit cavity and the entrance cavity for recirculating the cooling medium, a temperature regulator connected to sense the temperature of the cooling medium leaving the exit cavity, and a temperature regulated drain in the conduit means connected to the temperature regulator for removing cooling medium when the temperature thereof exceeds a predetermined amount.

14. An eddy current brake as in claim 13 including means for supplying fresh cooling medium to the conduit means for the recirculating medium.

15. An eddy current brake as in claim 14 including a pump in the conduit means for recirculating the cooling medium.

16. An eddy current brake as in claim 2 including conduit means between the exit cavity and the entrance cavity for recirculating the cooling medium.

* * * * *